Maurice Rona, Inventor,
by Julian J. Wittel,
his Attorney.

March 22, 1938.    M. RONA    2,111,903
ADJUSTING DEVICE FOR TAKING X-RAY PICTURES
Filed Feb. 7, 1936    2 Sheets-Sheet 2
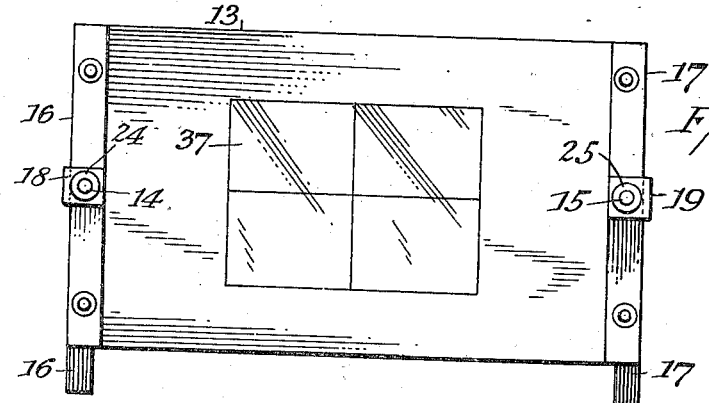
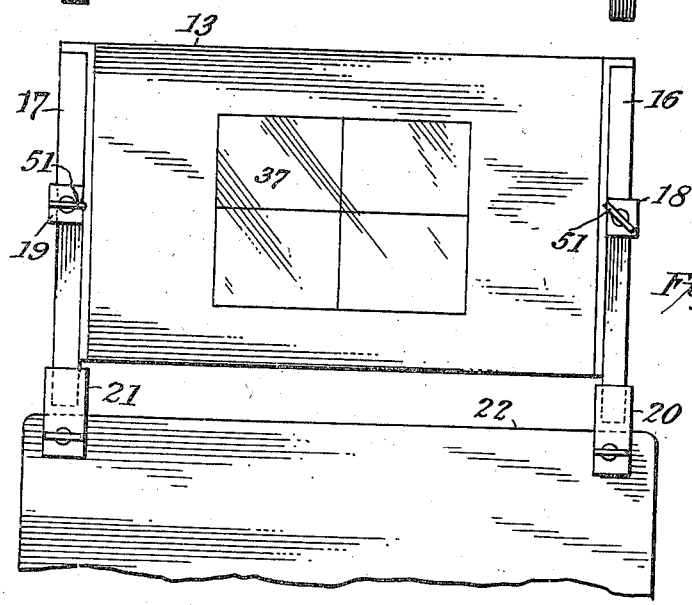
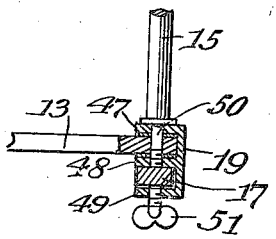
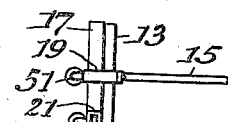
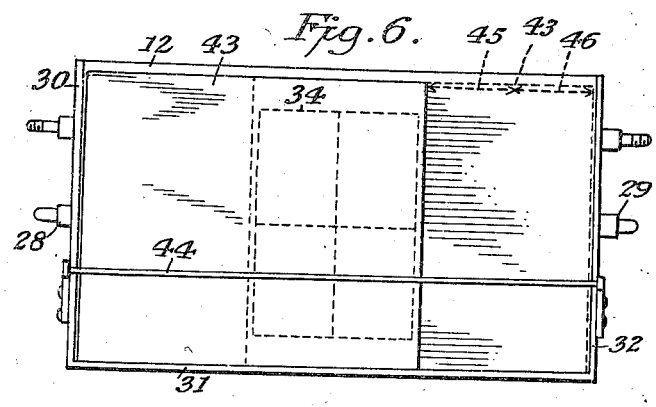
MAURICE RONA,
INVENTOR,
BY
HIS ATTORNEY Patented Mar. 22, 1938

2,111,903

UNITED STATES PATENT OFFICE 2,111,903

ADJUSTING DEVICE FOR TAKING X-RAY PICTURES

Maurice Rona, New Brunswick, N. J.

Application February 7, 1936, Serial No. 62,776

6 Claims. (Cl. 250—34)

My invention relates to adjusting devices for roentgenography of the head, or part of the head, of a person in the erect, sitting posture.

Roentgenography of the head requires a very painstaking and accurate technique. The complex bony structures give overlying and confusing shadows that must be separated from each other to get readable and informative roentgenograms. The head must be placed in special positions, and the Roentgen rays must traverse a difinite course through predetermined entrance and exit points on the head. For that purpose it is necessary not only to manipulate the head, but also to adjust the X-ray tube and the film-cassette to the head in reference to their distance and angle.

This adjustment may be done without any mechanical device, manually, by observation, but the results so obtained are usually unsatisfactory, necessitating perhaps several trials in a slow and awkward way.

Various mechanical means have been devised to aid in the taking of such exact roentgenograms, but the objections, mentioned hereinbefore in relation to the mechanically unaided taking of the pictures, are also applicable to these mechanical aids, now in use. One such aid, for instance, consists in providing an inclined plane support for the head, face or forehead of the person, whereby said person will lie down, with his face or forehead resting on said support, in the required position and thereafter taking the roentgenogram at the desired angle and distance.

However, if any part of the head rests on the cassette in the manner just described, then minor deviations and tiltings from the accurate position are impossible to detect after the positioning was finished.

Therefore, the technical procedures have to satisfy certain postulates that may briefly be stated as follows:

The technician must be sure that the head is in the proper, special position and that the part to be examined is in the center of the roentgenographic field. Therefore, the entire head, from all directions and at all times, must be free for inspection, and no part of the Roentgen apparatus should obstruct the view. The technician must be able to make, if necessary, adjustments on the positions, therefore, no part of the apparatus must hinder an easy access to the head.

Motion, whether caused by the person examined or by the examiner, must not change even slightly the special positions. Yet the person examined must feel comfortable in order that he co-operate willingly. Therefore, the support and rest of the head must be firm.

Manipulation of the cassette, such as insertion, shifting and removal, should not disturb the special position of the part roentgenographed, nor the relation of the Roentgen apparatus, and especially that of the cassette, to the head, therefore special construction is needed to insure steadiness, which must be maintained whether the cassette is placed against, above or below the part roentgenographed.

One object of my invention now is to provide mechanical aids, whereby the head may be securely and comfortably supported in any one of the various, specific positions and whereby the X-ray film-cassette may be adjusted to the part roentgenographed in an exact manner as to position, distance and angle, and said film may be secured in said position during the exposure.

Another object of my invention is to provide a device as characterized hereinbefore which will give freedom of inspection and freedom of adjustment of the head both from the front and from the rear before taking the picture.

Still further objects of my invention will be apparent as the specification of the same proceeds, and among others I may mention: to provide a device which besides giving secure and comfortable support to the head in specific positions, and besides giving freedom of inspection and access for adjustment of the head, also assures easy manipulation of the cassette at any angle without causing disturbing motion; which will be easy to adjust and secure in its adjusted position; which will allow observation of fluid levels in the sinuses and injection of opaque materials into the sinuses for diagnostic purposes when such procedures seem necessary; which will be simple in construction, comparatively inexpensive to manufacture and which will be easy and expeditious to apply.

In the drawings, forming a part of this specification and accompanying the same:

Fig. 4 is a front elevation of the stationary support, while

Fig. 5 is a rear elevation thereof;

Fig. 6 is a plan view of the movable support, and

Fig. 7 is a fragmentary sectional detail of a portion of the stationary support;

Fig. 8 is a semi-diagrammatical side elevation of a modified form of my stationary support.

Figure 1:
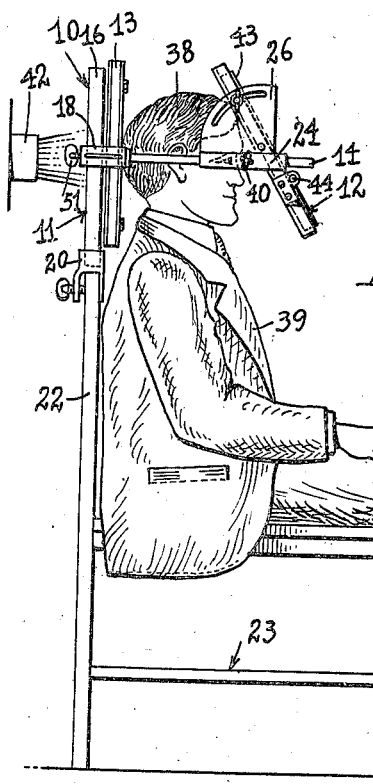
Fig. 1 is a side view of my assembled device as applied on the back of a chair showing its application to the head of a person sitting on the chair.

Referring now to the drawings more closely, by character of reference, numeral 10 indicates my device in general consisting of two main portions, one being a generally vertical stationary support indicated by the numeral 11 and the other a swingable and adjustable movable support indicated by the numeral 12.

In the embodiment shown in the figures, the stationary support 11 consists of a plate 13 normally set into a vertical position and into the two vertical sides thereof are set and secured the two horizontally projecting arms 14 and 15. The plate 13 is adjustably carried by two posts 16 and 17 being secured thereon by the releasable clamping members 18 and 19 in a manner which will be obvious by inspecting the figures (particularly Fig. 7). The supporting posts 16 and 17 carry fork shaped devices 20 and 21 by which the vertical supporting plate 13 may be releasably secured on any appropriate object like on the back 22 of a chair 23. It is to be understood that the stationary, vertical supporting plate 13 may also simply be secured on any suitable leg or stand, and the patient arranged in relation thereto in any other appropriate manner.

Two slidable sleeves 24 and 25 may be arranged on the arms or pins 14 and 15, each of said sleeves carrying an upstanding lug, or segment, 26 and 27, respectively, and the second movable support plate 12 may be pivoted in said upstanding lugs 26 and 27, as at 28 and 29. The movable or adjustable support 12 is provided with flanges or walls 30, 31, and 32 at its two side edges and at the bottom edge, respectively, and a window or opening 33 may be provided in its center, covered by any appropriate transparent material 34 and preferably also having the two center lines 35 and 36 thereof marked thereon. A similar window 37 may be arranged in the center of the stationary support plate 13.

The use and operation of my device is as follows:

Supposing that a portion of the head 38 of a person 39 is to be photographed or examined by X-ray, the said person will be caused to sit on the chair 23 and the vertical support plate 13 adjusted as to height, whereupon, the rear of the head of the person to be examined or photographed will be leaned against said vertical support and then the adjustable movable support plate 12 will be moved up to the head 38 and adjusted as to angle so that the desired portion of the head, like the sinus, is in the desired position and location in relation to the movable support plate 12, whereupon, said movable support may be secured in its position by the wingnuts, 40 and 41, as will be understood.

The respective windows 34 and 37 in the front and rear supports, with their center lines, will greatly aid in positioning the head in relation to the two supports of the device, by making the part under examination directly observable.

The X-ray producing apparatus 42 is now arranged in the right manner in the rear of the head 38 while the X-ray film cassette 43 will be placed on the movable support plate 12 resting against its upstanding flanges 30, 31, and 32, respectively, a cross rod 44 may also be arranged bridging the flanges 30 and 32 under which the X-ray cassette 43 may be slid.

Figure 3:
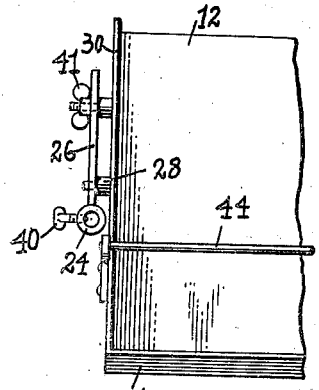
Fig. 3 is a fragmentary front elevation of the left hand side of the movable support.
Figure 2:
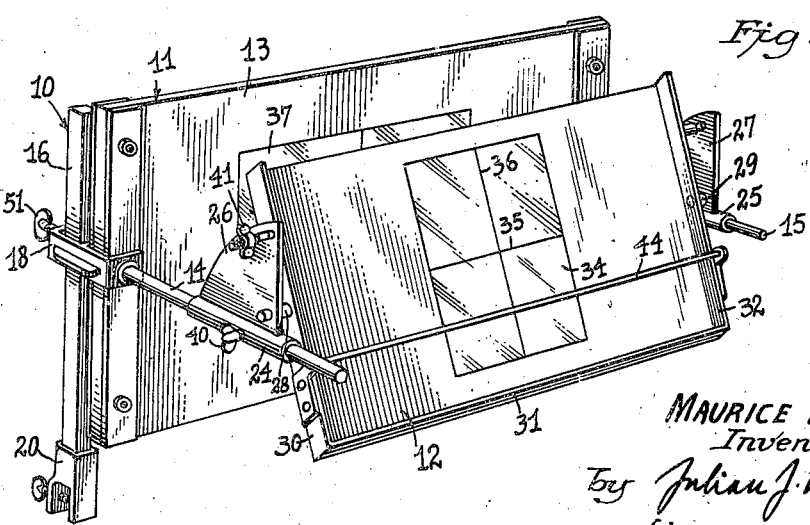
Fig. 2 is a perspective view of the stationary and of the movable and adjustable supports used in my device.

Two exposures or pictures will preferably be taken by one adjustment of the movable support plate 12, and in Fig. 6, I indicate the location of the film cassette 43 for the first exposure, being pushed to the extreme left hand side of the movable support plate 12, as indicated by the full lines in said Fig. 3, and by the arrow 45, while in the other case said cassette will be moved to the extreme right side of the support plate 12, as indicated by the dot and dash lines and by the arrow 46.

In the preferred embodiment of my device, the vertical stationary supporting plate 13 will carry said pins or rods 14 and 15 in an easily removable manner, as illustrated in Fig. 7, in which case the clamping device 19 will have three flanges or branches, 47, 48, and 49, the vertical stationary support plate 13 being set between the flanges 47 and 48 and a reduced portion 50 of the respective rod 14 or 15 will be set into appropriate holes in the flanges 47 and 48 and in the support plate 13 itself, the hole in the flange 48 and the end of the reduced portion 50 being screw threaded for the said releasable securing of them to one another. The supporting post or leg 17, for the stationary support plate 13 is set between the flanges 48 and 49 and the clamp 19 secured thereon by the wingnut 51.

It will be seen that I provide a device by which all the objects enumerated herein before, may be attained and provide a device which will be easy to manipulate, simple in construction, and will also be adjustable and adaptable to many various conditions while the same may be conveniently taken apart and stored or shipped in an easy manner.

In Fig. 8 I indicate a form of my device, wherein a stationary stand, leg or post 52 is employed for supporting the plate 13, and, as mentioned hereinbefore, said plate 13 may have such leg or post 52 integral therewith, in which case the clamping adjusting and supporting devices 18, 19, 16, 17, 20, and 21, respectively, may all be omitted.

What I claim as new, is:

1. In an adjusting device for roentgenography of the head, in an erect position, a first relatively stationary plate like substantially vertical direct support and rest for the back of the head to be roentgenographed; a second separate plate like support for the film cassette, positioned in the front of said head; a connection between said first and second supports so that said second support is carried by said first support, means in said connection whereby said second support may be adjusted as to its distance to said first support; means in said connection whereby said second support may be adjusted as to its angle to said first support, means to move said first support in an upward or downward direction thereby moving said second support therewith, means to secure said first support in its adjusted upward or downward position, and means to secure said second support in its relative distance and angle to said first support.

2. In an adjusting device as set forth in claim 1, said device being adapted for roentgenography of the head of a sitting person, a seat for the person, said first support being secured on said seat and being movable upwardly and downwardly in relation thereto, and means to secure said first support on said seat in its adjusted position.

3. In an adjusting device as set forth in claim 1, said connection between said two supports, comprising an arm projecting from said first support on which said second support may slide, and around which it may rock.

4. In an adjusting device as set forth in claim 1, said connection between said first and second supports comprising two arms projecting from said first support, and said adjusting means as to distance and angle, comprising means on said second support to make it slidable on said arms and rockable on an axis passing through said sliding means.

5. In an adjusting device as set forth in claim 1, observation windows in each of said supports.

6. In an adjusting device as set forth in claim 1, upstanding flanges around said second support to form the same into a carrier for the film cassette, a central transparent portion in said second support, and two non-transparent side sections, the cassette being shiftable on said second support from one section to the other.

MAURICE RONA.